United States Patent [19]

Donley

[11] Patent Number: 4,731,571
[45] Date of Patent: Mar. 15, 1988

[54] CONTROL FOR STABILIZING THE ALIGNMENT POSITION OF THE ROTOR OF A SYNCHRONOUS MOTOR

[75] Inventor: Lawrence I. Donley, Lemont, Ill.

[73] Assignee: The United States of America as represented by the United States Department of Energy, Washington, D.C.

[21] Appl. No.: 710,880

[22] Filed: Mar. 12, 1985

[51] Int. Cl.$^4$ .............................................. H02P 5/40
[52] U.S. Cl. ..................................... 318/702; 318/314
[58] Field of Search ............... 318/747, 748, 749, 809, 318/807, 701, 702, 314, 318

[56] References Cited

U.S. PATENT DOCUMENTS

| | | | |
|---|---|---|---|
| 3,268,788 | 8/1966 | Branco | 318/314 |
| 3,659,169 | 4/1972 | Waddicor | 318/701 |
| 3,829,747 | 8/1974 | Woolfson et al. | 318/702 |
| 4,078,192 | 3/1978 | Fultz | 318/314 |
| 4,143,311 | 3/1979 | Lee | 318/702 |
| 4,298,832 | 11/1981 | Acker et al. | 318/318 |
| 4,339,703 | 7/1982 | Rolff et al. | 318/701 |
| 4,480,215 | 10/1984 | Bax | 318/314 |

*Primary Examiner*—David Smith, Jr.
*Attorney, Agent, or Firm*—Robert J. Fisher; Hugh W. Glenn; Judson R. Hightower

[57] ABSTRACT

A method and apparatus for damping oscillations in the rotor load angle of a synchronous motor to provide stable rotational alignment in high precision applications. The damping method includes sensing the angular position of the rotor and utilizing the position signal to generate an error signal in response to changes in the period of rotation of the rotor. The error signal is coupled to phase shift amplifiers which shift the phase of the motor drive signal in a direction to damp out the oscillations in the rotor load angle.

8 Claims, 8 Drawing Figures

CONTROL FOR STABILIZING THE ALIGNMENT POSITION OF THE ROTOR OF A SYNCHRONOUS MOTOR

CONTRACTUAL ORIGIN OF THE INVENTION

The United States Government has rights in this invention pursuant to contract No. W-31-109-ENG-38 between the United States Department of Energy and Argonne National Laboratory.

BACKGROUND OF THE INVENTION

This invention relates generally to the field of controls for synchronous motors and, more particularly, to a method and apparatus for stabilizing the rotational alignment of the synchronized rotor of a synchronous motor.

Some applications of hysteresis synchronous motors require extremely precise rotational alignment or angular positioning of the rotor during operation. For example, in high energy particle experiments, an intense pulsed neutron source is generated by bombarding a target which emits a stream of neutrons. The neutrons are then passed through a "chopper", which is a cylinder having aligned slits of predetermined width that by accurate timing can yield the speed of flight of the neutrons and thereby determine their energy. The chopper is rotated by a hysteresis synchronous motor at approximately 270 revolutions per second and the slits of the chopper allow neutrons to pass only when they are properly angularly aligned during rotation. The highly precise and uniform rotation required can be affected by many factors such as intermittent bearing drag, changes in wind currents, or fluctuations in the drive frequency or current.

A hysteresis synchronous motor in its normal operating mode is synchronized with the drive frequency such that the rotor lags the stator magnetic axis by a stable load angle determined by the load on the motor. An intermittent bearing drag or other fluctuation can cause additional lag of the rotor such that the rotor magnetic axis would lag the stator magnetic axis by the steady state load angle plus an angular increment. The larger the increment, the larger the magnetic force on the rotor, causing it to tend to return to its steady state load angle after the intermittent fluctuation in load is gone. This force tends to cause the rotor to overshoot, causing the load angle to decrease beyond the steady state load angle. The rotor thus "hunts" to get back to its desired angular alignment, resulting in undesirable oscillations which can last many seconds if not damped. Another source of oscillations can occur when the drive frequency is changed by small increments for the purpose of changing the speed of the motor. When such a small change occurs, a load angle increment builds up until the rotor is pulled toward alignment, at which time it will overshoot again, resulting in phase oscillations about the steady state load angle. These problems are particularly acute for large inertia loads and they severely limit the ability to maintain stable and precise angular alignment that is required in many applications. Thus, it is highly desirable to be able to damp out these oscillations in an economical manner without having to physically modify the basic design of the motor itself.

In the prior art, a number of methods for controlling motors have been developed. A substantial number of methods have been developed for generating and controlling the current that is supplied to the armature of the motor to control the velocity of the motor, but not the phase of the rotor. These methods are unsuitable for hysteresis synchronous motors which do not have armature windings or currents. Further, these methods do not provide the needed precise phase control of the rotor. Another prior art system synchronizes the rotor position with an external reference, but does not provide damping or phase stabilization of the rotor. Many controllers are simply designed to develop the proper current to drive the motor. None of the known prior art motor control systems provide active damping of rotor oscillations about its normal synchronous phase for a hysteresis synchronous motor.

It is accordingly an object of this invention to provide an improved method and apparatus for maintaining rotational alignment of the rotor of a synchronous motor.

It is another object of the invention to provide an improved method and apparatus for damping phase oscillations of the rotor of a hysteresis synchronous motor caused by minor load changes and small abrupt changes in drive frequency.

Still another object of the invention is to provide damping of excursions from rotational alignment of the rotor of a hysteresis synchronous motor by phase shifting the stator magnetic axis in response to an error signal proportional to a change in the rotor period of rotation.

Yet another object of the invention is to provide apparatus for minimizing rotational alignment oscillations of a rotor in response to abrupt changes in drive frequency by phase shifting the input power with phase shift amplifiers to start the rotor towards realignment earlier than would otherwise occur.

SUMMARY OF THE INVENTION

Briefly, according to one embodiment of the invention, apparatus is provided for stabilizing the rotational alignment of the rotor of a synchronous motor driven in synchronization by a master clock signal including sensor means for generating rotor position signals representative of the position of the rotor. Error signal means provides an error signal in response to the position signals representative of the changes in the period of rotation of the rotor and phase shift amplifiers shift the phase of the master clock signal in response to the error signal, thereby damping out oscillations in the rotational alignment of the rotor.

In another embodiment of the invention, apparatus is provided for reducing oscillations in rotational alignment of the rotor of a synchronous motor driven by a master clock signal having selectable abrupt changes in frequency including sensor means for generating position signals representative of the position of the rotor. An error signal generator provides an error signal in response to an abrupt change in frequency and phase shift amplifiers shift the phase of the master clock signal in response to the error signal so as to reduce oscillations caused by the abrupt change in frequency.

BRIEF DESCRIPTION OF THE DRAWINGS

The invention together with further objects and advantages thereof, may be understood by reference to the following description taken in conjunction with the accompanying drawings.

DETAILED DESCRIPTION OF THE PREFERRED EMBODIMENT

Figure 1:
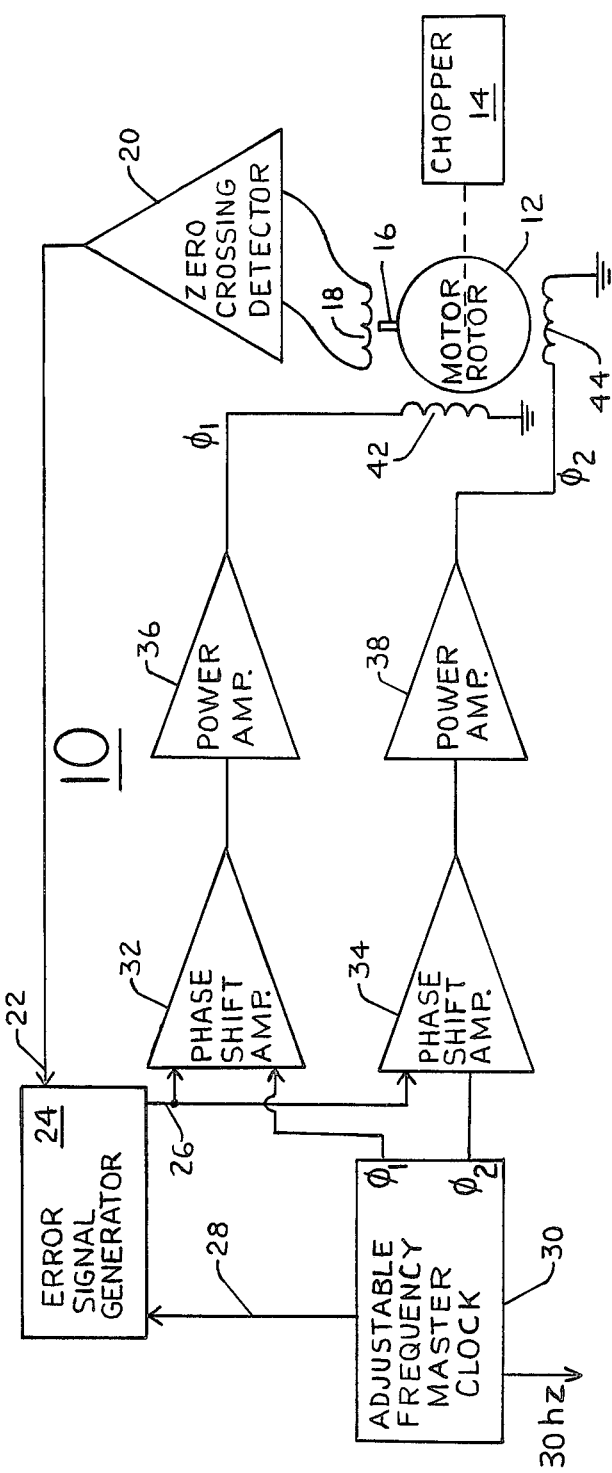
FIG. 1 is a generalized block diagram illustrating a specific embodiment of a system for damping oscillations of the rotor of a synchronous motor driving a neutron chopper according to the invention.

FIG. 1 is a generalized block diagram illustrating a specific embodiment of a system 10 for controlling rotational alignment of a chopper of an Intense Pulse Neutron Source according to the invention. A rotating hysteresis synchronous motor rotor 12 is utilized to drive a rotating chopper 14 which allows neutrons to pass only when the chopper is properly aligned rotationally. The rotor is driven in its normal synchronous mode by two stator coils 42, 44 energized by two AC power signals which are shifted in phase from one another by 90 degrees. These AC power signals are supplied by an adjustable master clock 30 which may be a conventional high accuracy crystal controlled adjustable frequency oscillator. The oscillator 30 generates the two power signals ($\phi_1$, $\phi_2$, 540 hz. sinewaves in the illustrated embodiment) which are coupled through two phase shift amplifiers 32, 34 and two power amplifiers 36, 38 to the coils 42, 44, as shown. The oscillator 30 also generates a 30 hz. signal for the purpose of synchronizing other equipment with the chopper. The frequency of the oscillator 30 may be adjusted. It should be noted that although a two phase hysteresis motor is utilized in the illustrated embodiment, a hysteresis synchronous motor of any number of phases may be used.

A magnet 16 is affixed to the rotor 12 such that a position signal is generated in a pick up coil 18 located in close proximity to the rotor 12 and magnet 16. Many types of position sensors are suitable in most applications, for example, a hall position sensor or optical position sensor would be suitable as long as radiation sensitivity is not a concern. The position signal is coupled, as shown, to a conventional zero crossing detector 20 which generates a position pulse for each complete rotation of the rotor 12. The position pulse is coupled in an input 22 of an error signal-generator 24 which compares successive periods of the pulse train representative of the period of rotation of the rotor 12 and generates an error signal on its output 26 in response to a change in period. Thus, if the period increases or decreases, an error signal is generated which is used to phase shift the stator magnetic axis in the direction which compensates for the detected change in period. In addition, if the frequency of the master clock 30 is changed, a frequency change signal is coupled to the error signal generator 24 via a conductor 28. In response to this frequency change signal, the error signal generator 24 generates an error signal which causes the rotor 12 to begin to change speed earlier than it normally would, thereby decreasing the motor overshoot as it tries to change to the new speed.

The error signal from the error signal generator 24 is coupled, as shown, to the two phase shift amplifiers 32, 34. These amplifiers 32, 34 shift the phase of the master clock 30 signal by an amount proportional to the error signal. This phase shifted signal is coupled to the power amplifiers 36, 38 which drive the stator coils 42, 44. The phase shifting of the power signals results in a phase shift in the stator magnetic axis increasing or decreasing the effective load angle of the synchronous motor rotor 12 in a direction to decrease the force of the motor in pulling the rotor back to alignment. This damps any oscillation caused by overshoot as the rotor accelerates or decelerates (i.e., hunting). The system 10 remains effective, damping oscillation by a factor of 100 for load change errors and by a factor of 1,000 for speed adjustment errors, as long as the changes in motor speed are not so great as to cause the rotor 12 to slip out of its synchronous mode.

Figure 2:
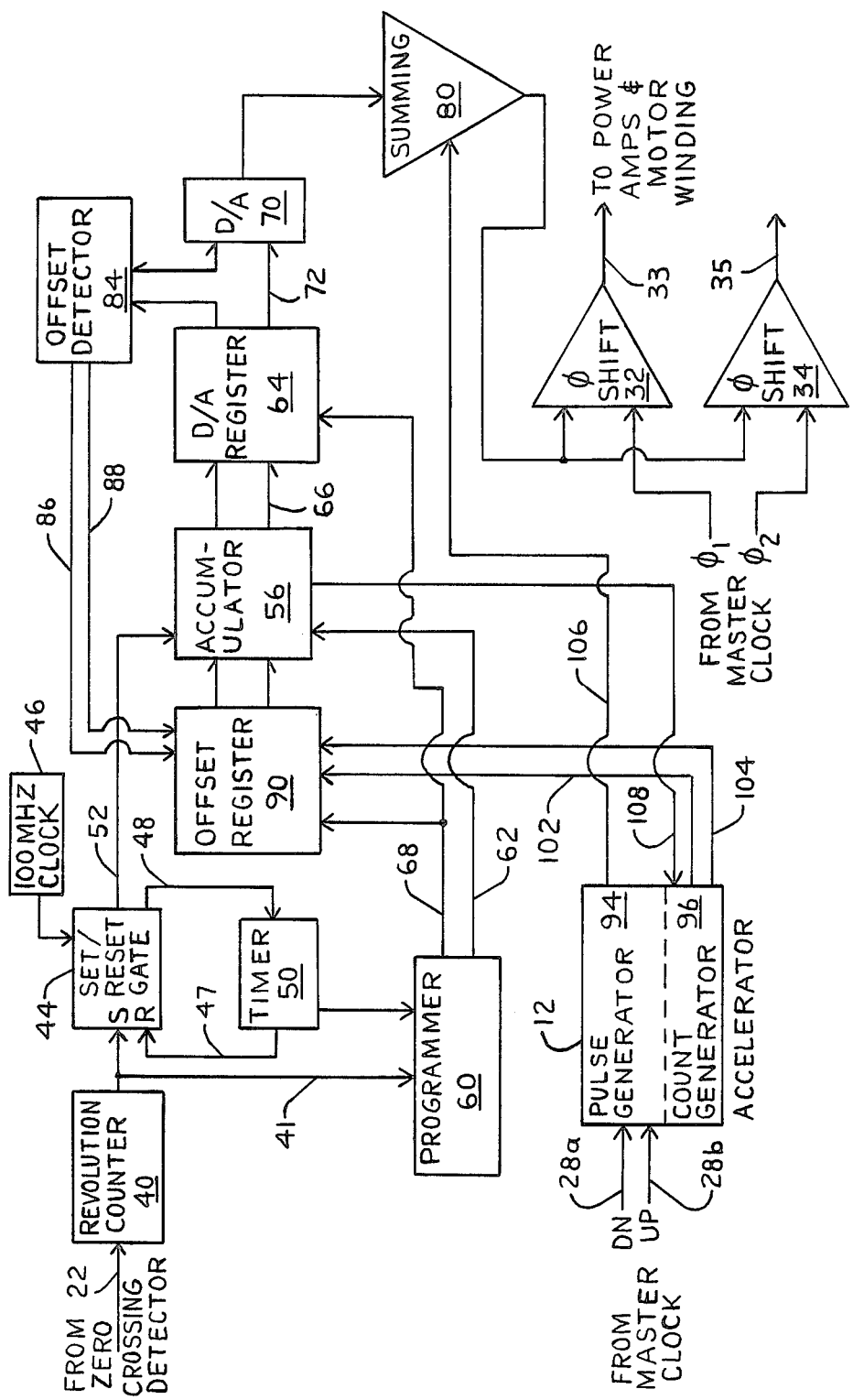
FIG. 2 is a detailed functional block diagram illustrating a specific embodiment of the error signal generator and phase shift amplifiers shown in FIG. 1.

Referring now to FIG. 2, there is shown a detailed block diagram illustrating a specific embodiment of the error signal generator 24 and phase shift amplifiers 32, 34 of FIG. 1. The circuit details of the specific embodiment of FIG. 2 are shown in FIGS. 3A to 3F which are detailed electrical schematic diagrams. The blocks of FIG. 2 are shown by dash lines in FIGS. 3A to 3F using identical reference numbers for identification of corresponding blocks.

Figure 3A:
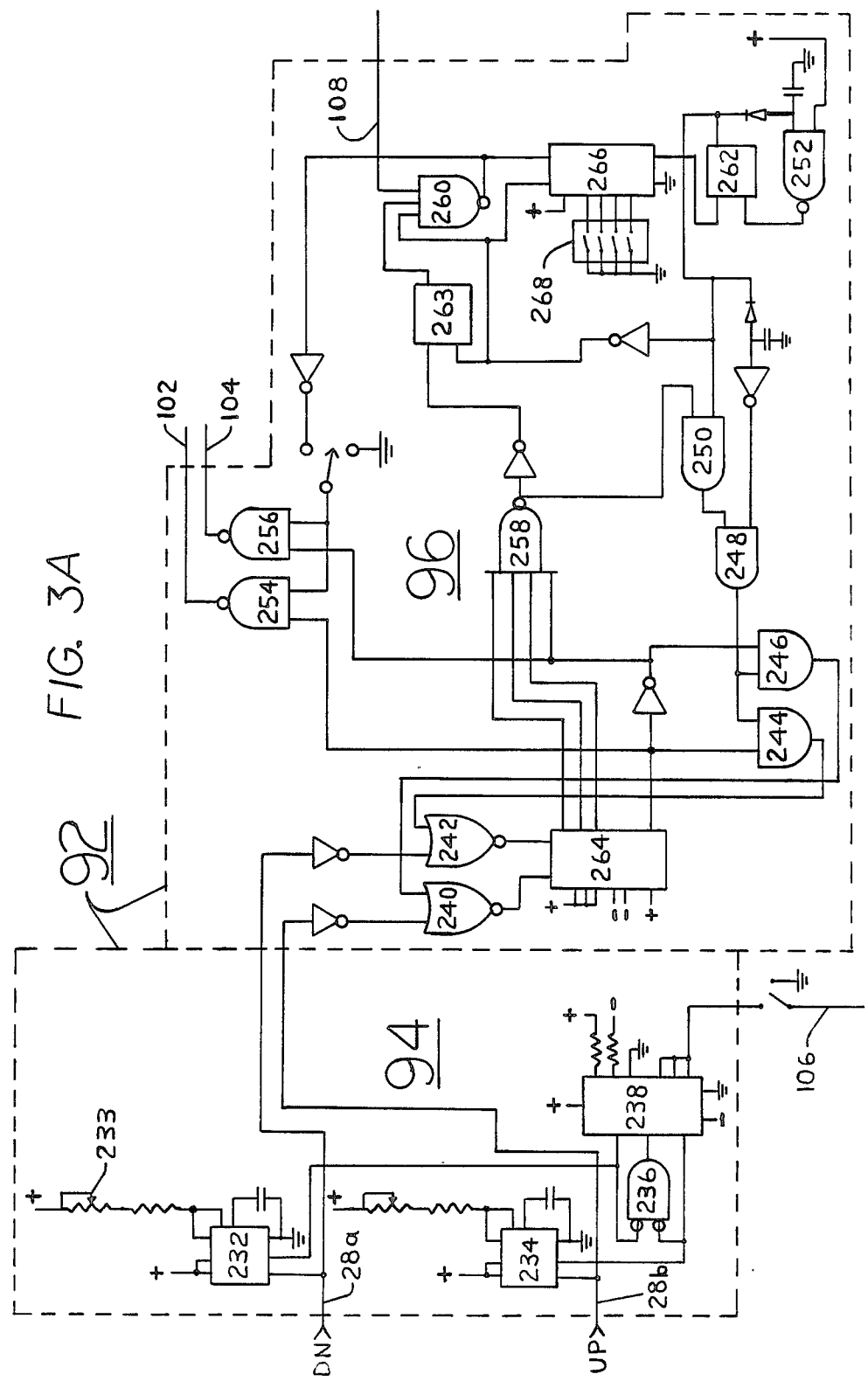
FIG. 3A is a detailed electrical schematic diagram illustrating portions of the circuitry shown in FIG. 2.
Figure 3B:
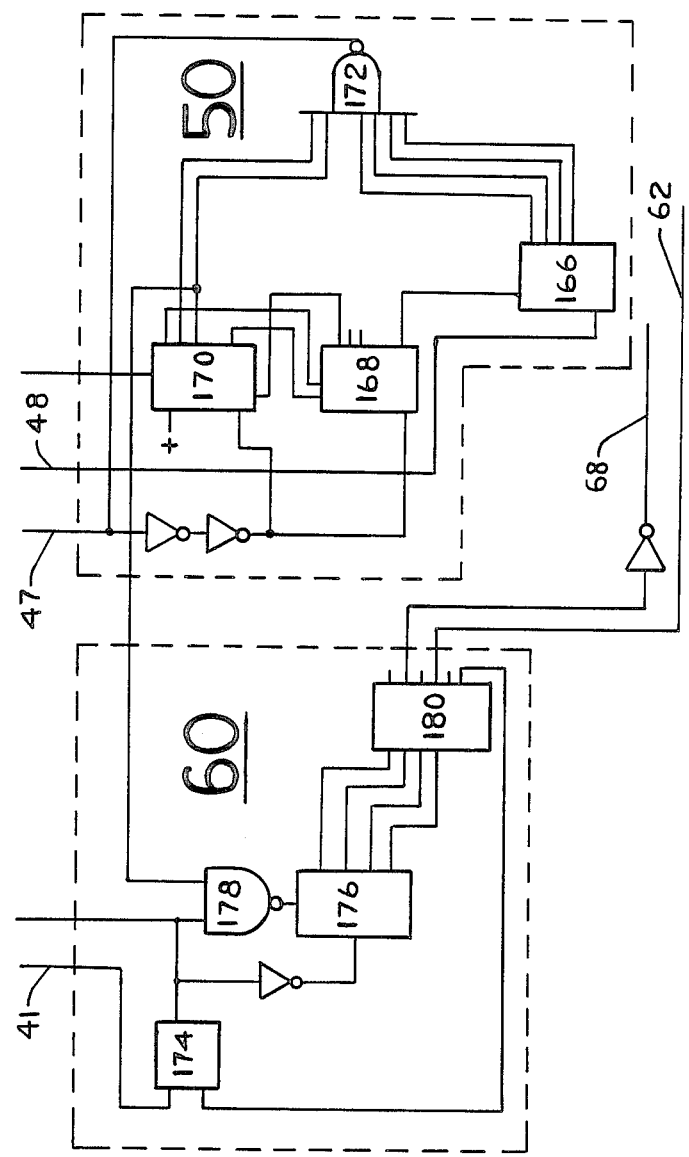
FIG. 3B is a detailed electrical schematic diagram illustrating portions of the circuitry shown in FIG. 2.
Figure 3C:
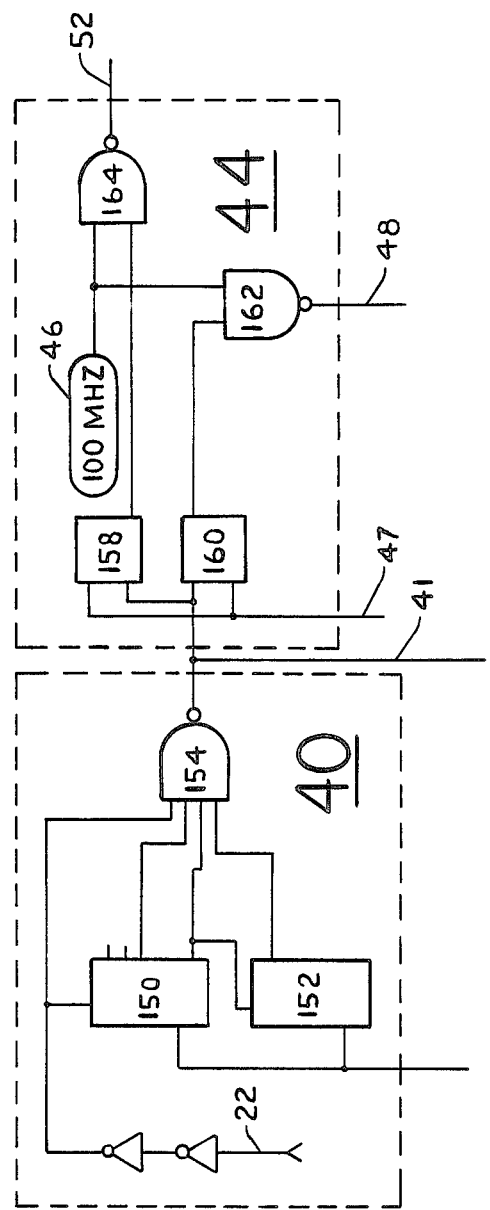
FIG. 3C is a detailed electrical schematic diagram illustrating portions of the circuitry shown in FIG. 2.

Position pulses from the zero crossing detector 20 (see FIG. 1) are coupled via the input 22 to a revolution counter 40. The revolution counter 40 is constructed as shown in FIG. 3C utilizing two binary counters 150, 152 (e.g., 74393's) and a NAND gate 154 (e.g., 7420). The revolution counter 40 counts a predetermined number (e.g., 32 in the illustrated embodiment) of position pulses (i.e. revolutions of the rotor) and then generates a set pulse which is coupled to a set/reset gate 44, as shown. Also coupled to the set/reset gate 44 is a conventional crystal control clock 46 which generates a 100 megahertz clock signal. The set/reset gate couples the 100 megahertz clock signal to a timer circuit 50 via a conductor 48 in response to the set pulse from the revolution counter 40.

The timer circuit 50 utilizes the 100 megahertz clock to accurately measure a predetermined period of time (e.g., approximately 75 microseconds in the illustrated embodiment) used to update and load various registers. At the end of the time period, the timer circuit 50 generates a reset signal which is coupled via a conductor 47 to the reset input of the set/reset circuit 44, as shown. This reset signal resets the set/reset circuit 44 causing it to couple the 100 megahertz clock to an accumulator circuit 56 via a conductor 52 until the next set pulse is generated. The accumulator circuit 56 accumulates a count of the clock pulses which is representative of the 32 periods between the position pulses (i.e., representative of the 32 periods of rotation of the rotor 12). As a result, a change in period of rotation of one part in ten to the seventh will cause a change of one in the accumulator number.

Figure 3D:
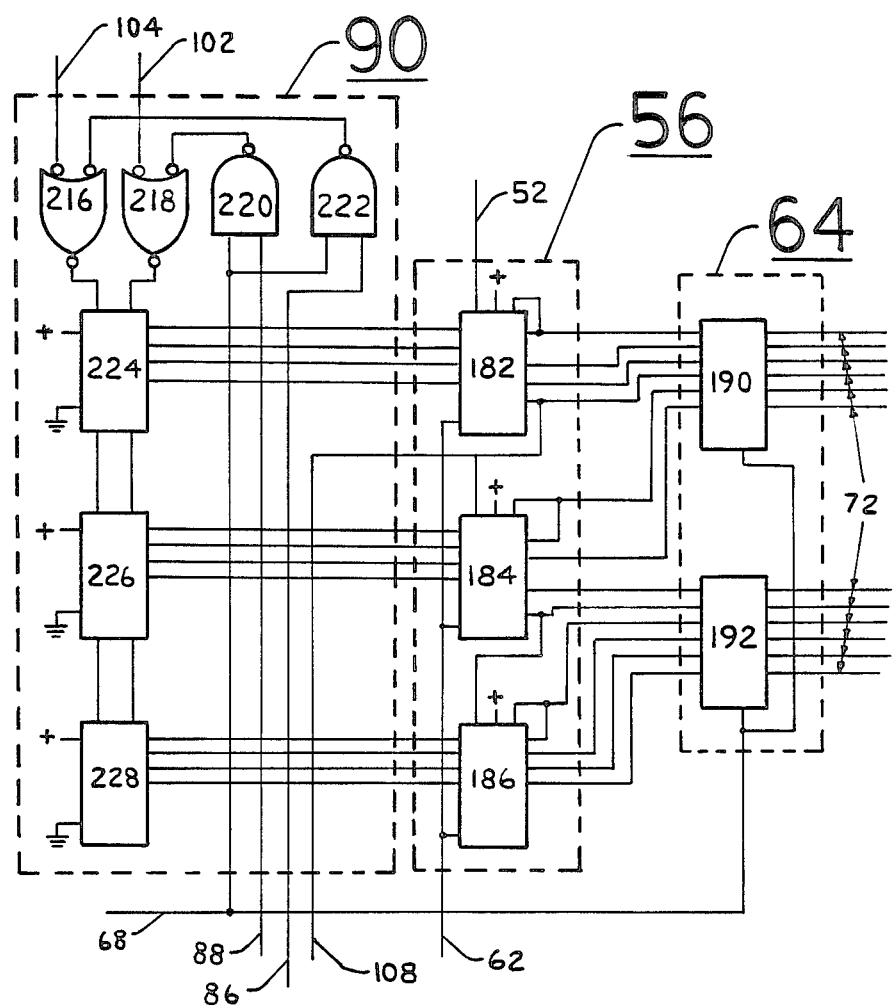
FIG. 3D is a detailed electrical schematic diagram illustrating portions of the circuitry shown in FIG. 2.
Figure 3E:
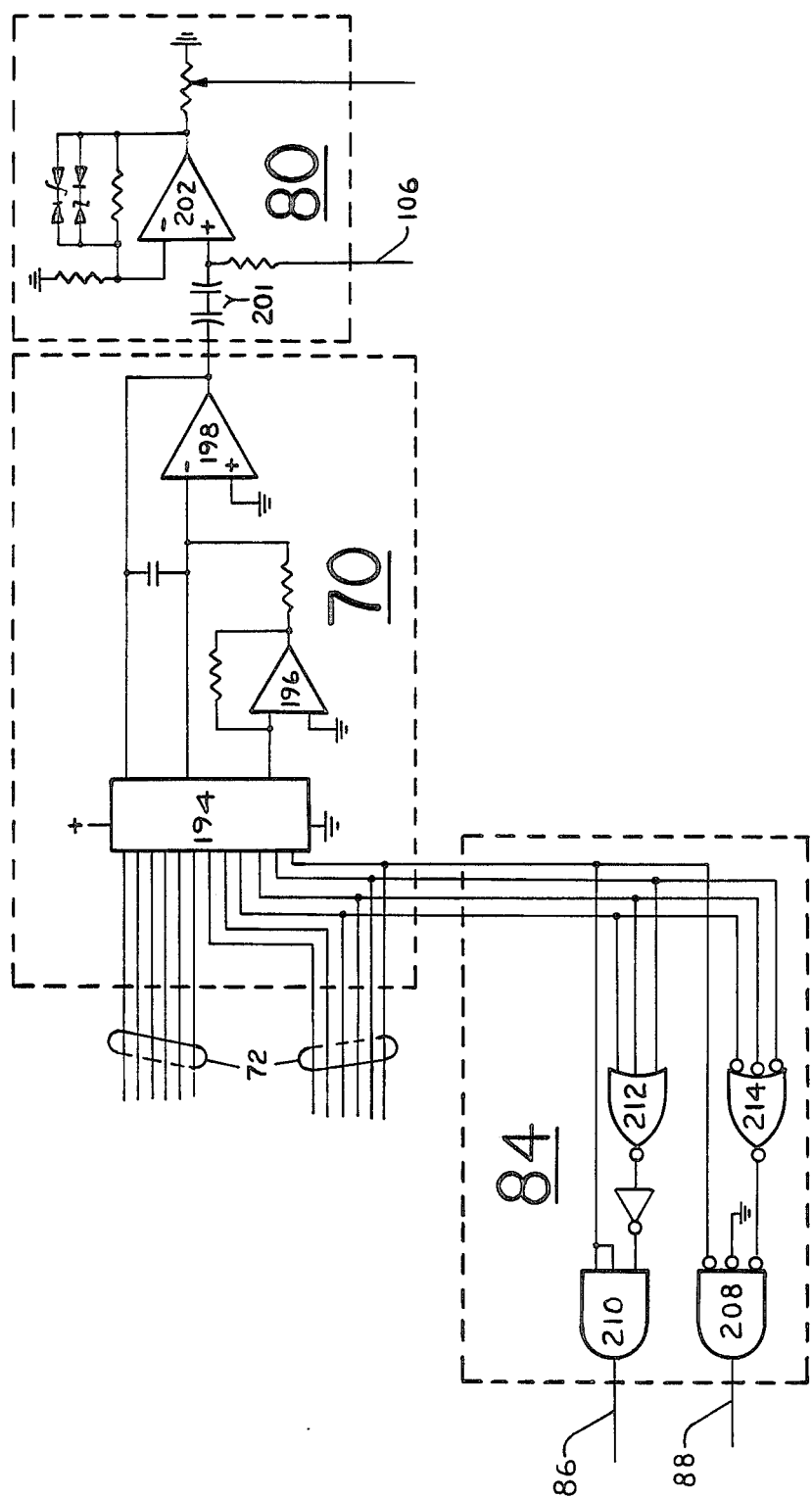
FIG. 3E is a detailed electrical schematic diagram illustrating portions of the circuitry shown in FIG. 2.
Figure 3F:
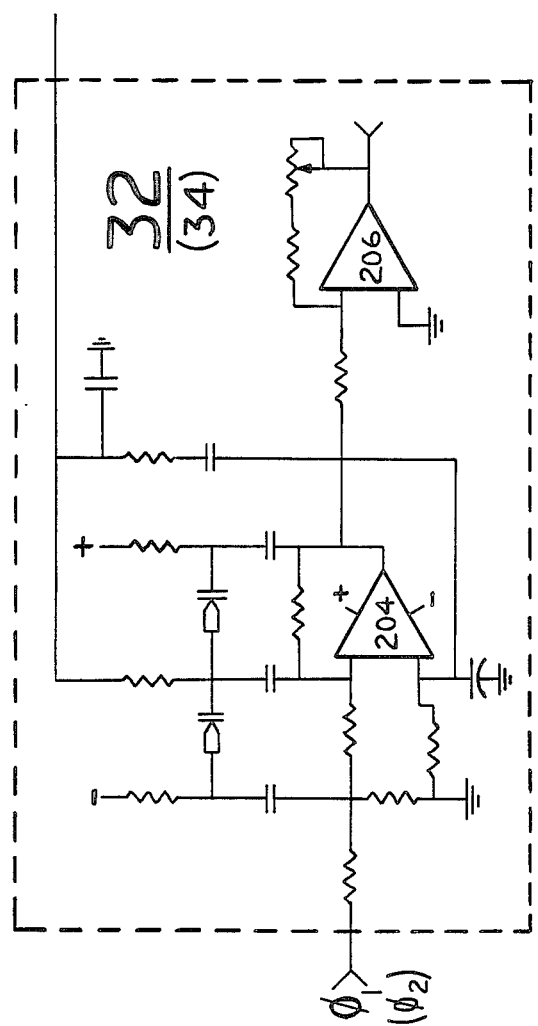
FIG. 3F is a detailed electrical schematic diagram illustrating portions of the circuitry shown in FIG. 2.

The accumulator 56 is composed of three presettable counters (e.g., 74S197) 182, 184, 186 as shown in FIG. 3F. The set/reset gate 44 comprises two flip flops 158, 160 (e.g., 74297's) and 2 NAND gates 162, 164 (e.g., 74S00) as illustrated in FIG. 3C, while the timer 50 is configured as shown in FIG. 3B utilizing a binary counter 166 (e.g., 74393), two presettable counters 168, 170 (e.g., 74S197's) and a NAND gate 172 (e.g., 74308).

The programmer 60 receives a restart signal from the revolution counter 40 via a conductor 41, as shown. The programmer 60 also receives a clock signal from the timer circuit 50 during the timer period. The programmer circuit 60 utilizes a flip flop 174 (e.g., 74297), a binary counter 176 (e.g., 74393), a NAND gate 178 (e.g., 7400), and a one of ten decoder 180 (e.g., a 7442) as shown in FIG. 3B. When gated on, the programmer circuit 60, via a signal on a conductor 62, causes the number in the accumulator 56 to be loaded into a digital to analog converter storage register 64 via a 12 line bus 66. This value in the digital to analog converter storage register 64 is applied to a digital to analog converter 70 (D/A) via a 12 line bus 72 where it is converted to an analog signal (i.e. an analog count value) and coupled to a summing amplifier 80. The analog count value is coupled in the summing amplifier 80 through a set of capacitors 201 (see FIG. 3E) which differentiate the signal producing a signal representative of the change in the analog count value. Thus the summing amplifier 80 acts as a differentiating amplifier. The output of the summing amplifier 80 is the error signal which is coupled to the phase shift amplifiers 32, 34, as shown. The digital to analog converter storage register 64 (FIG. 3D) is composed of two latches 190, 192 (e.g., 74174's) and the digital analog converter 70 utilizes a digital to analog converter circuit 194 (e.g., a 7530) configured with two operational amplifiers 196, 198 (e.g., 747's) as illustrated in FIG. 3E. The summing amplifier is an operational amplifier 202 (e.g., 747) structured as a summing amplifier as shown in FIG. 3E. The phase shift amplifiers 32, 34 (FIG. 3F) are identical to each other and utilize a conventional phase shift amplifier configuration with two operational amplifiers 204, 206 (e.g., a 528 and a 747, respectively) and varactors in a lead-lag configuration, as shown in FIG. 3F.

In some situations, as in the illustrated embodiment the precision required results in such a large number in the accumulator 56 that it is advantageous to limit the size of the accumulator and only use the least significant digits to generate the error signal. Thus, in the illustrated embodiment, the accumulator uses only 12 bits and the accumulated number rolls over (i.e. overflows) several times during a period. To keep the accumulator 56 from improperly overflowing and to keep the digital to analog converter operating in the center of its range, an offset detector 84 is coupled to the output of the digital to analog converter storage register 64 via the bus 72, as shown. The offset detector determines whether the number in the digital to analog converter storage register 64 is in the mid range of the digital to analog converter 70 by sensing the 4 most significant bits. The offset detector 84 then couples control signals via conductors 86, 88 to an offset register 90 causing the offset register to count up or down one bit depending upon whether the number in the digital to analog converter storage register 64 is too high or too low. The number in the offset register 90 is then used to preset the accumulator 56 in response to a control signal from the programmer 60 coupled via conductor 68 to the digital analog converter storage register 64 and the offset register 90. This tends to keep the digital to analog converter 70 operating at its mid-point (i.e., output of zero) except when there is a change in the period of rotation of the rotor. The offset detector 84 utilizes two NOR gates 208, 210 (e.g., 7427's) and two AND gates 212, 214 (e.g., 7411's), and the offset register 90 utilizes two AND gates 216, 218 (e.g., 7408's), two NAND gates 220, 222 (e.g., 7400's), and three synchronous up/down counters 224, 226, 228 (e.g., 74193s) configured as shown in FIG. 3D-3E.

In accordance with another aspect of the present invention, an accelerator circuit 92 is provided to rapidly compensate for small desired changes in the master clock 30 frequency that are intended as a result of operator intervention. Two lines from the master clock 28a and 28b are coupled to the accelerator 92, as shown. Each upward change in frequency (of 2 parts in ten to the seventh) will generate a pulse on the up line 28b and a similar downward change will generate a pulse on the down line 28a. Each pulse will cause a preselected number (e.g., 5, selected by means of a set of DIP switches 268 shown in FIG. 3A) to be loaded into the offset register 90 via conductors 102, 104, as the frequency of the clock 30 is changed. This change in the accumulator anticipates the change in the length of period of rotation of the rotor (which is delayed from the time the clock frequency changes because the rotor must build up a load angle increment before it will change speed) having the proper value so that the alignment control system 10 causes the rotor 12 to come to its new speed instead of resisting the change. In addition, the accelerator 92 couples a change pulse of predetermined duration (preselected by means of a potentiometer 233) to the summing amp 80 on a conductor 106 in response to the change in frequency pulse. If the change is an increase, it is a positive pulse causing the load angle to increase and if the change is a decrease, it is a negative pulse causing the load angle to decrease.

The change pulse is added into the signal from the digital to analog converter 70 by the summing amp 80 to generate the error signal. This effectively increases the gain of the system by immediately forcing an error signal to the phase shift amplifiers. This provides an immediate change in the error signal in a direction to shift the magnetic axis of the stator to cause the rotor to immediately start to approach the new speed. This greatly reduces the overshoot and the time to settle to the new speed. The offset count is generated in the accelerator 92 by a count generator section 96, and the change pulse is generated by a pulse generator section 94. A clock signal gated on only when the accumulator is gated on is provided to the accelerator circuit 92 via conductor 108 from the accumulator 56, as shown in FIG. 2. The pulse generator section 94 comprises two timer circuits 232, 234 (e.g., 555's), an NOR gate 236 (e.g., 7402) and an analog switch 238 (e.g., 7510) as shown in FIG. 3A. The count generator utilizes two NOR gates 240, 242 (e.g.,7402's), four AND gates 244, 246, 248, 250 (e.g., 7408's), three NAND gates 252, 254, 256 (e.g., 7400's), two NAND gates 258, 260 (e.g., 7420's), two flip flops 262, 263 (e.g., 74279), two binary counters 264, 266 (e.g., 74193's) and a set of dip switches 268, configured as shown in FIG. 3A.

A specific embodiment of the synchronous motor stabilizing control has been described for purposes of illustrating the manner in which the invention may be made and used. It should be understand that implementations of other variations and modifications of the invention in its various aspects will be apparent to those skilled in the art, and that the invention is not limited by the specific embodiments described. It is therefore contemplated to cover by the present invention any and all modifications, variations, or equivalent which fall within the true spirit and scope of the basic underlying principles disclosed and claimed herein.

What is claimed is:

1. A method of stabilizing the rotational alignment of the rotating rotor of a synchronous motor driven with a period of rotation determined by a drive signal that is generally synchronized to a clock signal generated by a master clock, wherein the master clock includes means for permitting abrupt changes in the frequency of the drive signal, comprising the steps of:

magnetically sensing the rotor and generating a pulse in response to said rotor reaching a predetermined angular position;

generating an error signal by generating high frequency clock pulses, accumularing a count of said clock pulses on a plurality of successive periods of rotation of the rotor, the count to an analog count value, differentiating the analog count value, generating a change pulse of preselected duration in response to the abrupt change in frequency, said change pulse having a polarity determined by the direction of the abrupt change in frequency, and adding the change pulse to the result of differentiating the analog count value to produce the error signal;

phase shifting the drive signal in response to the error signal to compensate for a change in period.

2. The method of claim 1 wherein the count is limited to a predetermined number of least significant bits and wherein the count is periodically preset in response to the count to maintain the count in a predetermined range.

3. The method of claim 1 wherein the selected abrupt changes in frequency produce a change rate of rotation further comprising the steps of modifying the error signal in response to the abrupt change in frequency to shift the phase of the stator magnetic axis in a direction to immediately initiate a change in rotor speed toward the changed rate of rotation thereby reducing oscillation due to the abrupt change in frequency.

4. The apparatus of claim 3 further comprising the step of updating the count responsive to the abrupt change in frequency thereby changing the count to represent a period corresponding to the changed rate of rotation.

5. An apparatus for stabilizing the rotational alignment of the rotating rotor of a synchronous motor driven with a period of rotation determined by a drive signal that is generally synchronous to a clock signal generated by a master clock, wherein the master clock includes means for permitting abrupt changes in the frequency of the drive signal to produce a changed rate of rotation of the rotor, the apparatus comprising:

means for magnetically sensing the rotor and generating a pulse in response to said rotor reaching a predetermined angular position;

means for generating an error signal by generating high frequency clock pulses, accumulating a count of said clock pulses on a plurality of successive periods of rotation of the rotor, converting the count to an analog count value, and differentiating the analog count value;

means for generating a change pulse of preselected duration in response to the abrupt change in frequency, said change pulse having a polarity determined by the direction of the abrupt change in frequency;

means for adding the change pulse to the result of differentiating the analog count value to produce the error signal; and means for phase shifting the drive signal in response to the error signal to compensate for a change in period.

6. The apparatus of claim 5 wherein the means for generating an error signal and accumulating a count further comprises means for limiting the count to a predetermined number of least significant bits and wherein the error signal means further comprises means for periodically presetting the count in response to the count to maintain the count in a predetermined range.

7. The apparatus of claim 5 wherein the means for permitting selected abrupt changes in frequency further comprises accelerator means for modifying the error signal in response to the abrupt change in frequency to shift the phase of the stator magnetic axis in a direction to immediately initiate a change in rotor speed toward the changed rate of rotation thereby reducing oscillation due to the abrupt change in frequency.

8. The apparatus of claim 7 wherein the accelerator means further comprises means for updating the count responsive to the abrupt change in frequency thereby changing the count to represent a period corresponding to the changed rate of rotation.

* * * * *